(12) United States Patent
Flook et al.

(10) Patent No.: US 8,598,286 B1
(45) Date of Patent: Dec. 3, 2013

(54) HIGH CIS DIENE/PHENYLBUTADIENE COPOLYMERS PREPARED USING A ZIEGLER/NATTA NEODYMIUM CATALYST

(71) Applicant: The Goodyear Tire & Rubber Company, Akron, OH (US)

(72) Inventors: Margaret McGuigan Flook, Cuyahoga Falls, OH (US); Stephan Rodewald, Fulton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/668,754

(22) Filed: Nov. 5, 2012

(51) Int. Cl.
*C08F 4/52* (2006.01)
*C08F 236/06* (2006.01)

(52) U.S. Cl.
USPC ............ 526/153; 526/164; 526/280; 526/337

(58) Field of Classification Search
USPC .......... 526/153, 164, 337, 280; 525/211, 232; 524/554, 573
See application file for complete search history.

(56) References Cited

U.S. PATENT DOCUMENTS

| | | | |
|---|---|---|---|
| 3,203,945 A * | 8/1965 | Zelinski | 526/141 |
| 3,417,065 A | 12/1968 | Marconi et al. | |
| 3,660,536 A | 5/1972 | Ayano et al. | |
| 3,937,692 A | 2/1976 | Lugli et al. | |
| 4,113,930 A | 9/1978 | Moczygemba | |
| 4,179,480 A | 12/1979 | Hsieh | |
| 4,223,116 A | 9/1980 | Moczygemba et al. | |
| 4,663,405 A | 5/1987 | Throckmorton | |
| 4,845,201 A | 7/1989 | Chauvin et al. | |
| 5,066,728 A | 11/1991 | Audett | |
| 5,135,816 A | 8/1992 | Audett | |
| 5,686,371 A | 11/1997 | Ansell et al. | |
| 6,479,601 B1 | 11/2002 | Kerns et al. | |
| 6,780,948 B2 | 8/2004 | Rachita et al. | |
| 8,071,700 B2 | 12/2011 | Thuilliez et al. | |
| 8,071,800 B2 | 12/2011 | Thuilliez et al. | |

FOREIGN PATENT DOCUMENTS

| | | |
|---|---|---|
| GB | 1002690 | 8/1965 |
| GB | 1294167 | 10/1972 |
| WO | 2011047021 A1 | 4/2011 |

OTHER PUBLICATIONS

Pragliola, S.; Cipriano, M.; Boccia, A. C. ; Longo, P. Macromol. Rapid Commun. 2002, 23, 356.
Tsuji, Y.; Suzuki, T.; Watanabe, Y.; Takegami, Y. Macromolecules 1981, 14, 1194.
Suzuki , T.; Tsuji, Y; Watanabe, Y.; Takegami, Y. Macromoleules 1980, 13, 849.
Suzuki T.; Tsuji, Y.; Watanabe, Y.; Takegami, Y. Polymer Journal, 11, 651.
Suzuki T.; Tsuji, Y.; Takegami, Y. Macromolecules 1978, 11, 639.
Ambrose, et al., Macromolecules 1972, 11, 277.
Marconi, W.; Mazzei, A.; Lugli, G.; Bruzzone, M J. Polym Sci : Part C. 1967, 16, 805.
Ashikari, Polymerization vol. 32, No. 10,1959, 1060.

* cited by examiner

*Primary Examiner* — Fred M Teskin
(74) *Attorney, Agent, or Firm* — John D. DeLong

(57) ABSTRACT

The present invention is directed to a polymer comprising repeat units derived from 1,3-butadiene and a substituted butadiene of formula I or II

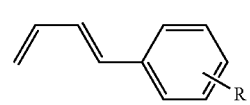

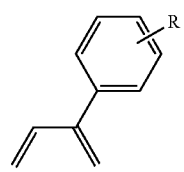

wherein R is hydrogen, an alkyl group, aryl group, or a fused cyclic group; and
wherein at least 95 percent by weight of the repeat units have a cis-1, 4 microstructure. The invention is further directed to a rubber composition and pneumatic tire comprising the polymer, and a method for making the polymer using a neodymium catalyst system.

8 Claims, 3 Drawing Sheets

HIGH CIS DIENE/PHENYLBUTADIENE COPOLYMERS PREPARED USING A ZIEGLER/NATTA NEODYMIUM CATALYST

BACKGROUND OF THE INVENTION

With existing tire polymer and compound technology there is a tradeoff between desirable tire properties using commonly used tire polymers. The impending introduction of fire labeling regulations, along with increased competition make it more important than ever to produce tires that show high performance in every category. Tire properties are directly related to the material properties of the polymers used in the tire, which are in turn directly related to the glass transition temperature ($T_g$) of the chosen polymer. The most commonly used tire polymers are cis-polybutadiene, natural rubber, high-vinyl polybutadiene, and styrene/butadiene copolymers; these polymers are largely chosen for different roles in tire compounds based on their $T_g$. The traditional relationships between polymer $T_g$ and three important tire performance properties are outlined in the following table.

| Performance characteristic | Effect of increasing $T_g$ |
| --- | --- |
| Rolling resistance | worsened |
| Tread wear | worsened |
| Wet traction | improved |

This relationship between $T_g$, tan delta, and tire properties can also be visualized by examining the tan delta curves of various polymers. The value of tan delta at various temperatures is commonly used as an indicator of polymer performance, for example, the tan delta at 0° C. is an indicator of wet performance, while the tan delta at 60° C. is an indicator of rolling resistance. A tire with a higher tan delta at 0° C., such as an SBR, also exhibits a high tan delta at 60° C., making it a good choice for wet performance, but bad for rolling resistance. The opposite is true for cis-polybutadiene: the tan delta is low at both 0° C. and 60° C., making cis-PBD an excellent choice for improved rolling resistance but poor for wet traction performance.

There is a tradeoff between wet performance and the other two important characteristics, and it would seem at first glance that there is no way around this natural tradeoff. However, the shape of the tan delta/temperature curve also influences the polymer properties. Polymers of different composition exhibit different relationships between their glass transition temperatures and physical properties. An ideal polymer would exhibit a higher $T_g$ and a steeper tan delta/temperature slope, allowing tan delta to be as high as possible in the wet traction regime and as low as possible in the rolling resistance regime. This ideal polymer is not known among existing tire elastomers, therefore there is a need for new technology to prepare new classes of polymers with properties approaching those of this ideal polymer.

Both high-cis polybutadiene rubber and low-cis butadiene/styrene copolymers have achieved widespread use as tire polymers, and are commonly used in blends in tire tread compounds to balance RR and traction properties. To date, however, there is no example of a polymer that combines the major aspects of these two important polymers, that is to say there are no established butadiene/styrene copolymers that contain a high-cis butadiene backbone.

SUMMARY OF THE INVENTION

The present invention is directed to a polymer comprising repeat units derived from 1,3-butadiene and a substituted butadiene of formula I or II

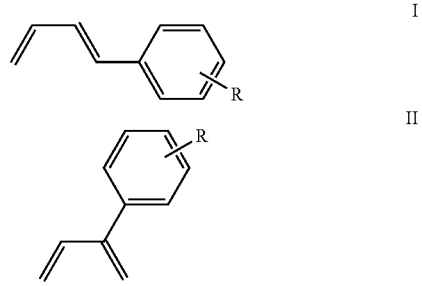

wherein R is hydrogen, an alkyl group, aryl group, or a fused cyclic group; and
wherein at least 95 percent by weight of the repeat units have a cis-1, 4 microstructure.

The invention is further directed to a rubber composition comprising the above polymer.

The invention is further directed to a pneumatic tire comprising the rubber composition.

The invention is further directed to a method of making a polymer, the method comprising the step of polymerizing 1,3-butadiene and a substituted butadiene of formula I or II

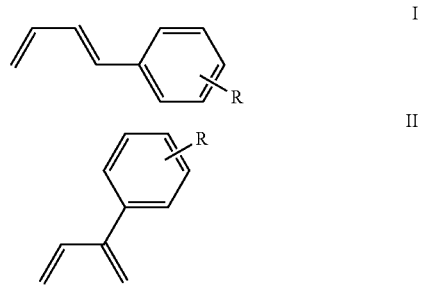

in the presence of an organic solvent and a catalyst system comprising the reaction product of an organoaluminum compound, a neodymium carboxylate, and a dialkyl aluminum chloride.

DETAILED DESCRIPTION OF THE INVENTION

Figure 1:
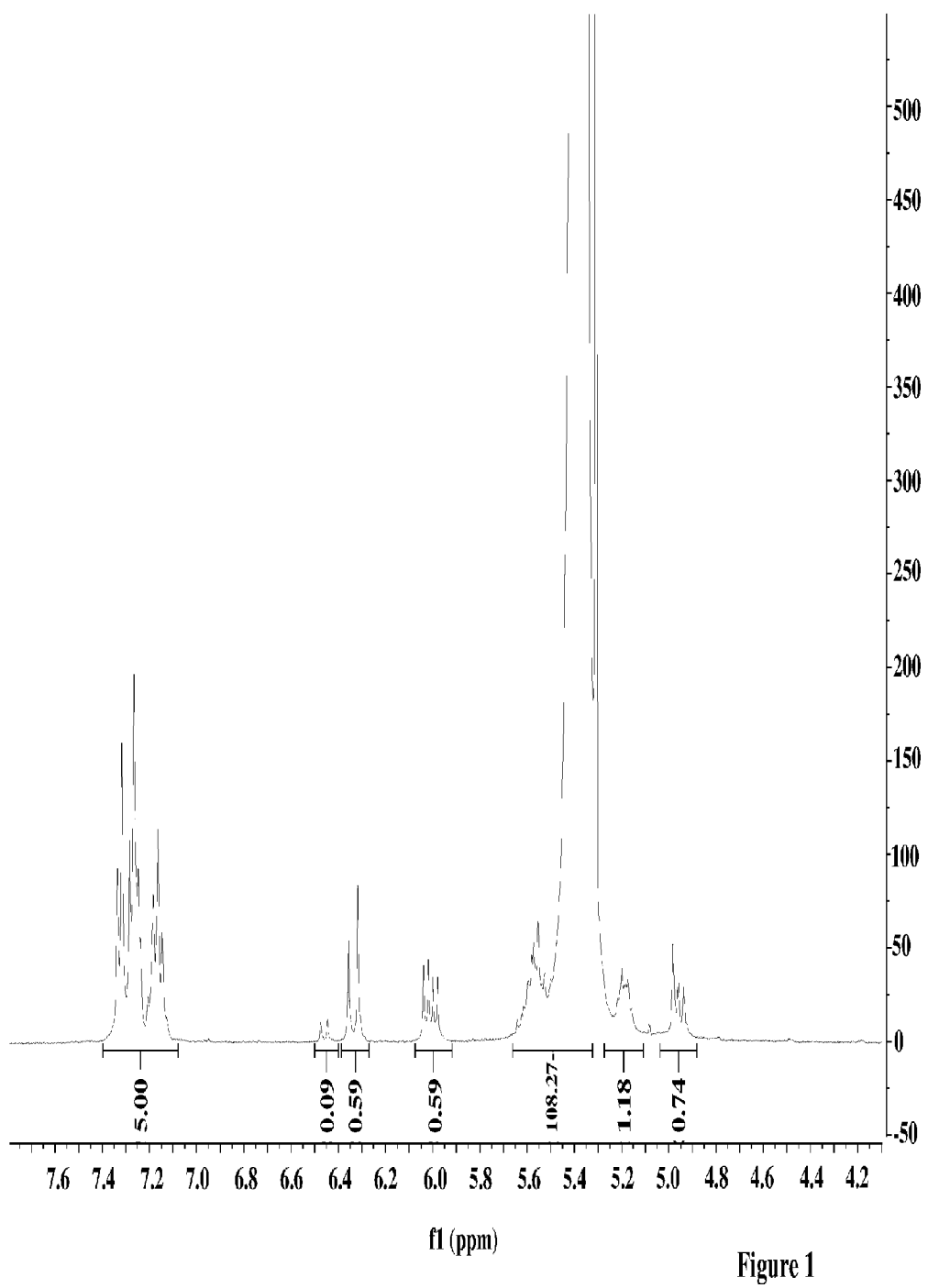
FIG. 1 shows an expanded region of $^1$H NMR spectrum of 1-PhBD/BD copolymer. Spectrum recorded in $CD_2Cl_2$

This invention relates to the synthesis of stereoregular copolymers of conjugated dienes with substituted dienes using Ziegler-Natta a catalysts, as described in Scheme 1. This approach allows for the production of a new family of polymers with potentially improved tire compound properties as compared to both stereoregular polydienes and existing diene/styrene copolymers.

Scheme 1: Copolymerization of butadiene with 1-phenylbutadiene using neodymium preformed catalyst

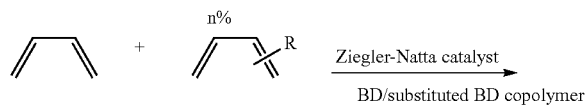

Suitable comonomers include 1-phenylbutadiene and 2-phenylbutadiene, and substituted derivatives of the two as shown in formulas I and II, where R is hydrogen, an alkyl group, aryl group, or a fused cyclic group. Appropriate comonomers may also be extended to include any substituted butadiene, including 1- or 2-substituted dienes where the substituent is any alkyl or aryl group.

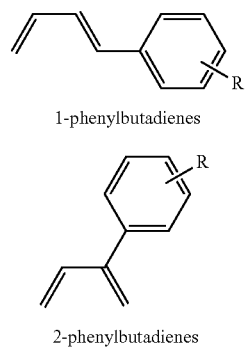

1-phenylbutadienes 2-phenylbutadienes

Copolymers of a conjugated diene and a 1-phenyl-substituted butadiene prepared with Ziegler-Natta catalysts may possess one of the four structures described in Table 1. The repeat units derived from the comonomers may exhibit random distribution throughout the copolymer, however block copolymer or tapered copolymers are also possible structures of the polymers. The properties of the resulting copolymers may depend strongly both on the nature of the insertion of the comonomer and on the blockiness of the copolymer incorporation.

Significantly, the copolymers have a high cis-1,4 insertion of the butadiene comonomer. In one embodiment, the copolymer comprises at least 95 percent by weight of repeat units with cis-4 microstructure, based on the total weight of the copolymer. In one embodiment, the copolymer comprises at least 98 percent by weight of repeat units with cis-1,4 microstructure, based on the total weight of the copolymer.

The copolymers of this invention are made via solution polymerization in the presence of a neodymium catalyst system. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations that utilize the catalyst systems of this invention, there will normally be from 90 to 99 weight percent butadiene monomer and 1 to 10 weight percent of phenylbutadiene monomer in the polymerization medium. Such polymerization mediums are, of course, comprised of an organic solvent, the monomer, and the catalyst system. In some embodiments, the polymerization medium will contain from 75 to 99.5 weight percent butadiene monomer. In some embodiments, the polymerization medium will contain from 0.5 to 25 weight percent phenylbutadiene monomer.

TABLE 1

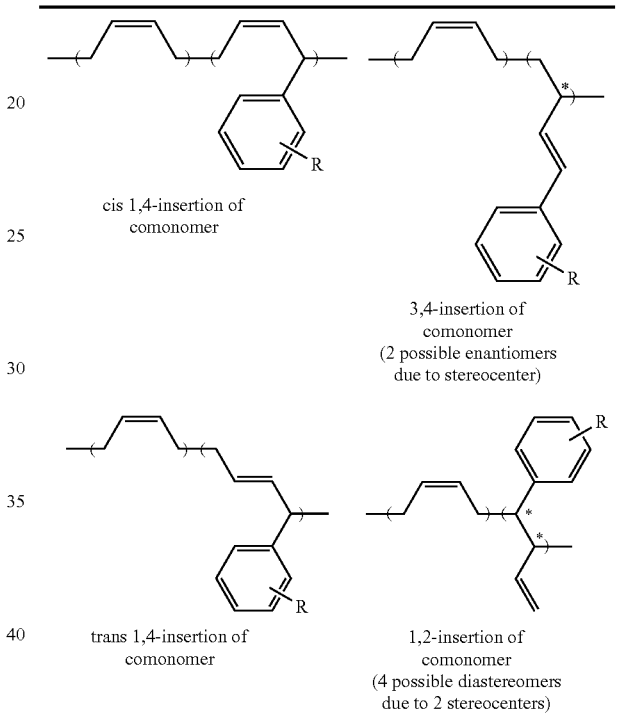

The neodymium catalyst system used in the process of this invention is made by preforming three catalyst components. These components are (1) an organoaluminum compound, (2) a neodymium carboxylate, and (3) a dialkyl aluminum chloride. In making the neodymium catalyst system the neodymium carboxylate and the organoaluminum compound are first reacted together for 10 minutes to 30 minutes in the presence of isoprene to produce a neodymium-aluminum catalyst component. The neodymium carboxylate and the organoaluminum compound are preferable reacted for 12 minutes to 30 minutes and are more preferable reacted for 15 to 25 minutes in producing the neodymium-aluminum catalyst component.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system can be aged for much longer time periods before being used with out any detrimental results.

The neodymium catalyst system will typically be preformed at a temperature that is within the range of about 0° C. to about 100° C. The neodymium catalyst system will more typically be prepared at a temperature that is within the range of about 10° C. to about 60° C. The neodymium catalyst system will preferably be prepared at a temperature that is within the range of about 15° C. to about 30° C.

The organoaluminum compound contains at least one carbon to aluminum bond and can be represented by the structural formula:

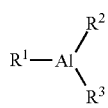

in which $R^1$ is selected from the group consisting of alkyl (including cycloalkyl), alkoxy, aryl, alkaryl, arylalkyl radicals and hydrogen: $R^2$ is selected from the group consisting of alkyl (including cycloalkyl), aryl, alkaryl, arylalkyl radicals and hydrogen and $R^3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride, and other organoaluminum dihydrides. Also included are diethylaluminum ethoxide and dipropylaluminum ethoxide. Also includes are trimethylaluminum, triethylaluminum, tri-n-propylaluminum, triisopropylaluminum, tri-n-propylaluminum, triisopropylaluminim, tri-n-butylaluminum, tri-isobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, and diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C., to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization can be terminated by the addition of an alcohol or another protic source, such as water. Such a termination step results in the formation of a protic acid. However, it has been unexpectedly found that better color can be attained by utilizing an alkaline aqueous neutralizer solution to terminate the polymerization. Another advantage of using an alkaline aqueous neutralizer solution to terminate the polymerization is that no residual organic materials are added to the polymeric product.

Polymerization can be terminated by simply adding an alkaline aqueous neutralizer solution to the polymer cement. The amount of alkaline aqueous neutralizer solution added will typically be within the range of about 1 weight percent to about 50 weight percent based upon the weight of the polymer cement. More typically, the amount of the alkaline aqueous neutralizer solution added will be within the range of about 4 weight percent to about 35 weight percent based upon the weight of the polymer cement. Preferable, the amount of the alkaline aqueous neutralizer solution added will be within the range of about 5 weight percent to about 15 weight percent based upon the weight of the polymer cement.

The alkaline aqueous neutralizer solution will typically have a pH which is within the range of 7.1 to 9.5. The alkaline aqueous neutralizer solution will more typically have a pH which is within the range of 7.5 to 9.0, and will preferable have a pH that is within the range of 8.0 to 8.5. The alkaline aqueous neutralizer solution will generally be a solution of an inorganic base, such as a sodium carbonate, a potassium carbonate, a sodium bicarbonate, a potassium bicarbonate, a sodium phosphate, a potassium phosphate, and the like. For instance, the alkaline aqueous neutralizer solution can be a 0.25 weight percent solution of sodium bicarbonate in water. Since the alkaline aqueous neutralizer solution is not soluble with the polymer cement it is important to utilize a significant level of agitation to mix the alkaline aqueous neutralizer solution into throughout the polymer cement to terminate the polymerization. Since the alkaline aqueous neutralizer solution is not soluble in the polymer cement it will readily separate after agitation is discontinued.

The copolymer of the invention may be compounded into a rubber composition.

The rubber composition may optionally include, in addition to the copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly large, in size.

Various commercially available silicas may be used such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° c. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this example, the synthesis of 1-phenylbutadiene is illustrated (Nakao, Y.; Idei, H.; Kanyiva, K. S.; Hiyama, T. J. Am Chem Soc. 2009, 131, 5070.)

Under a nitrogen atmosphere, methyltriphenylphosphonium bromide (16.6 g, 0.0465 mol) was suspended in 150 mL of anhydrous tetrahydrofuran in a 500-mL round bottom flask equipped with a gas inlet. The mixture was cooled to 0° C. and n-butyl lithium (31.5 mL, 1.6 M solution in hexanes, 0.051 mol) was added to it via cannula over a period of 5 minutes. The mixture became bright yellow/orange and homogeneous. After 45 minutes, trans-cinnamaldehyde (5.125 g, 0.0388 mol) was added to the solution dropwise via syringe. Pale solids formed immediately. After stirring 2 h at 0° C., 100 mL of hexane and 20 g of silica gel were added to the mixture, and the solids were removed by vacuum filtration and washed with hexane. The filtrate was concentrated by rotary evaporation to afford a yellow/orange oil. A colorless liquid was distilled from the oil at 62° C. and 6 mbar. The yield was 1.1 g (22%) and the $^1$H NMR spectrum of the liquid matched that reported for trans-1-phenylbutadiene. The product was stored under nitrogen at −40° C.

EXAMPLE 2

In this example, the preparation of phenylbutadiene/butadiene copolymers is illustrated.

40 mL of 15% butadiene solution in hexanes was transferred to a 4-oz bottle under nitrogen atmosphere. A solution of 1-phenylbutadiene from Example 1 (48 mg, 1.2 weight % relative to butadiene) dissolved in 0.5 mL anhydrous hexanes was added to the bottle, followed by 0.8 mL of 0.1 M TIBA solution in hexanes. Preformed neodymium catalyst solution was added to the mixture (0.42 mL of 0.0191 M 1/25/2.5 Nd Versatate/TIBA/DEAC), and the bottle was heated to 65° C. for 1 h. After 1 h, 0.5 mL of a 10% BHT/isopropanol solution was added to terminate the polymerization, and the resulting mixture was dried overnight in air to afford the expected polymer in 90% yield. The polymer was determined to have a Mn of 162,000 and a PDI of 2.5. The presence of aryl functional groups in the polymer was confirmed by 1H NMR spectroscopy and GPC (UV detector).

Subsequent polymerizations were done using the same procedure, but with high concentration of 1-phenylbutadiene corresponding to 2.4 and 11 weight percent relative to butadiene. A control polymerization of butadiene with no added 1-phenylbutadiene was also done. Table 2 shows polymer yields and molecular weights for copolymerization of 1-phenylbutadiene with butadiene. The reaction rate decreased with increasing percentage of phenylbutadiene in the monomer feed.

TABLE 2

| Weight % 1-PhBD | Mol % 1-PhBD | Polymer Yield | Rxn Time | Mw (×10$^{-3}$) | Mn (×10$^{-3}$) | PDI |
|---|---|---|---|---|---|---|
| 0 | 0 | 102% | 2 h | 515 | 200 | 2.6 |
| 1.2 | 0.5 | 93% | 2 h | 400 | 162 | 2.5 |
| 2.4 | 1.0 | 81% | 2 h | 398 | 163 | 2.4 |
| 11 | 5 | 62% | 9 h | 327 | 114 | 2.9 |

The microstructure of the copolymer derived from 2.4% phenylbutadiene with butadiene was determined by $^{13}$C NMR spectroscopy, as described in Table 3.

TABLE 3

| Structure | % |
|---|---|
| 1,4-cis | 98.0 |
| 1,4-trans | 1.5 |
| 1,2 | 0.5 |

The resulting PhBD/BD copolymers were investigated by $^1$H NMR and DSC and compared to those of the butadiene homopolymers. The $^1$H NMR spectrum (aromatic and olefinic region) of a PhBD/BD copolymer prepared with 10 wt % PhBD is shown in FIG. 1.

The resonances between 7.0-7.4 ppm in the spectrum displayed in FIG. 1 correspond to the aromatic resonances of PhBD incorporated in the polymer, and are distinct from the corresponding resonances of the monomer. The pattern of peaks between 6.0-6.4 ppm arise from the olefin protons of the inserted monomer, and are strongly suggestive of vinyl insertion of PhBD. The small doublet at 6.5 ppm can be ascribed to 1,4-insertion of the comonomer, and the relative integration of these two sets of olefinic resonances suggest that the ratio of 1,4-insertion to 3,4-insertion of PhBD in the copolymer is around 1:5.

Further polymerizations were done as indicated in Table 4, with analysis by $^1$H NMR and differential scanning calorimetry (DSC). The $^1$H NMR spectra of the PhBD/BD copolymers described in Table 4 revealed olefinic peaks corresponding to both 3,4-insertion and 1,4-insertion of the phenylbutadiene copolymer, in a ratio of about 5:1, respectively. As summarized in Table 4, the incorporation of the comonomer as measured by $^1$H NMR was only 40-60% of what was expected based on the makeup of the monomer feed. To investigate the source of this lack of incorporation, the copolymerization reaction was monitored by gas chromatography. The results of this study are described in FIG. 2.

TABLE 4

| PhBD % in feed | | PhBD % in copolymer (det'd by $^1$H NMR) | | Tg (° C.) (det'd by DSC) |
|---|---|---|---|---|
| wt % | mol % | wt % | mol % | |
| 0 | 0 | 0 | 0 | −103.2 |
| 2.5 | 1 | 1.4 | 0.6 | −102.3 |
| 10 | 4.1 | 4.3 | 1.8 | −98.8 |

Figure 2:
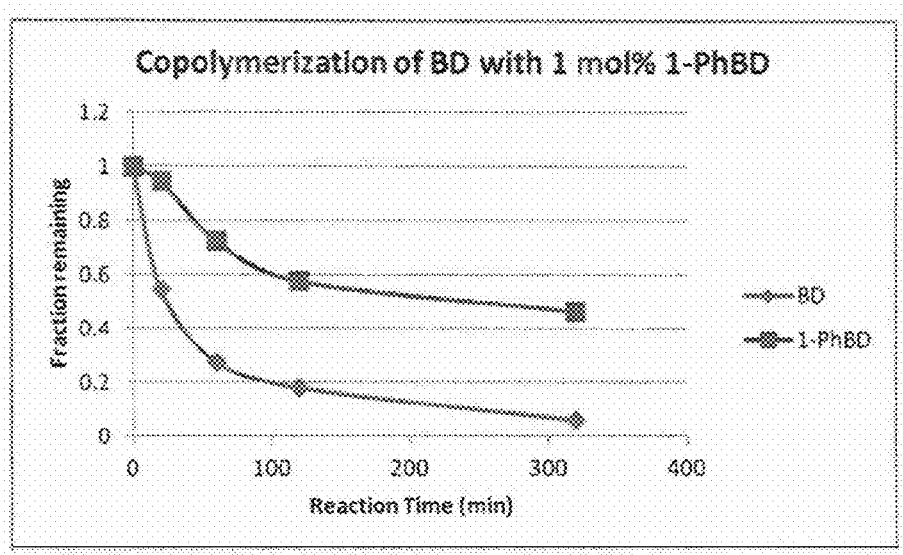
FIG. 2 illustrates the copolymerization of 1-PhBD with BD, PhBD fraction remaining measured by GC and BD fraction remaining measured by polymer weight. Catalyst=0.2 mmphm NdVers/TIBA/DEAC 1:25:2.5

As seen in FIG. 2, after complete consumption of butadiene in 5 hours, about 50% of the initial amount of phenylbutadiene still remains in the reaction mixture. While it is possible that longer reaction times might increase the amount of PhBD incorporation, the data presented here suggest that higher levels of incorporation of 1-phenylbutadiene will be difficult with this system, as polymerization of 1-PhBD is clearly not as favorable as polymerization of BD. Attempted homopolymerization of 1-phenylbutadiene with the same NdVers/TIBA/DEAC catalyst mixture led to no production of polymer and full recovery of starting monomer after 5 days at 60° C. One possible reason for the low level of 1-PhBD incorporation and for the difficult in homopolymerization might be the electronic effect of the phenyl substituent of the comonomer: phenyl ring draws electron density from the polymerizable butadiene unit, making binding of the diene to Nd less favorable. The steric effect of the bulky phenyl substituent might also play a role in the reduced polymerizability of 1-PhBD. The results presented here concerning the copolymerization of 1-phenylbutadiene with butadiene suggest two major points. First, the neodymium/TIBA/DEAC catalyst system can be directly applied to the copolymerization of butadiene with 1-phenylbutadiene to prepare BD/PhBD copolymers that maintain the cis-selectivity of the original BD polymerization system. Second, 1-PhBD does not incorporate fully into the resulting copolymer under standard polymerization conditions, suggesting that different comonomers might be better suited towards introduction into the Nd-PBD system.

Because of the unexpectedly low incorporation of 1-phenylbutadiene into a Nd-catalyzed PBD, 2-phenylbutadiene was also investigated as a potential comonomer. Copolymerization results are described in Table 5.

TABLE 5

| Weight % 2-PhBD | Mol % 2-PhBD | Polymer Yield | Rxn Time |
|---|---|---|---|
| 0 | 0 | 100% | 2 h |
| 2 | 0.8 | 100% | 4 h |
| 5 | 2.1 | 85% | 4 h |
| 10 | 4.2 | 37% | 4 h |

The copolymerization of butadiene with 2-phenylbutadiene was investigated by gas chromatography to determine the relative rates of polymerization of the two monomers. Under the same conditions as described for the copolymerization of 1-phenylbutadiene with BD, 2-phenylbutadiene was found to be incorporated much more readily than the 1-isomer.

Figure 3:
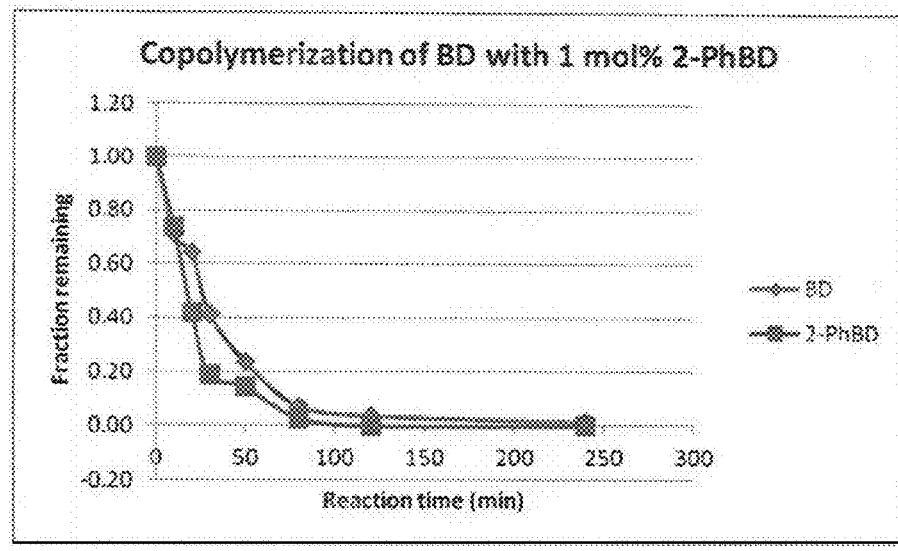
FIG. 3 illustrate the copolymerization of 2-PhBD with BD, phBD fraction remaining measured by GC and BD fraction remaining measured by polymer weight. Catalyst=0.2 mmphm NdVers/TIBA/DEAC 1:25:2.5

In the reaction described in FIG. 3, all of the 2-phenylbutadiene was consumed by the end of the butadiene polymerization, while the same copolymerization with the 1-isomer (FIG. 2) left almost half of the comonomer unreacted at the end of the butadiene polymerization. This difference in reactivity suggests that 2-substituted phenylbutadienes will be more viable comonomers than their 1-substituted counterparts. It is more likely that copolymers of high comonomer incorporation will be able to prepared with the 2-PhBD than with 1-PhBD.

Discussion

Although Ziegler/Natta technology is well established for the synthesis of a variety of high-cis diene homopolymers, there is comparatively little literature on the synthesis of high-cis butadiene copolymers incorporating any other comonomer, including styrene. Such new polymers have the potential to exhibit properties approaching that of the "ideal polymer" described above. Cis-selective Ziegler/Natta diene polymerizations catalysts generally do not polymerize α-olefins such as styrenes, meaning that high-cis copolymers of butadiene with mono-olefins will likely never be reported with known catalyst technology. A few references have appeared in the literature claiming the copolymerization of styrenes and butadienes using lanthanide catalysts, however such polymers have generally been plagued with low yield, low styrene incorporation, and low cis content (Kobayashi et al., *J. Polym. Sci: A: Polym. Chem.* 1998, 36, 1707; Zhang et al., *Eur. Polym. J.* 2002, 38, 869; Xu et al., *Chin. J. Chem.* 2004, 22, 764; Jin et al., *Polymer* 1996, 37, 349; Zhu et al., *J. Appl. Polym. Sci.* 2007, 106, 103.

The preparation of high-cis Ziegler/Natta copolymers of 2-phenylbutadiene and butadiene was first reported in the mid 1960s (Nordsiek, *Kautschuk Gummi Kunstoffe* 1985, 38, 178; Rodgers et al., *Technical Papers—American Chemical Society, Rubber Division, Spring Technical Meeting* 2004, p. 332; Kobayashi et al., *J. Polym. Sci: AL Polym. Chem.* 1998, 36, 1707.)

Using a titanium catalyst, the authors found that copolymers of BD and PhBD with between 10-100% phenylbutadiene incorporation could be prepared, and that the $T_g$ of the resulting copolymer increased linearly with the amount of phenylbutadiene incorporation. The results of these studies are summarized in Table 6.

TABLE 6[1]

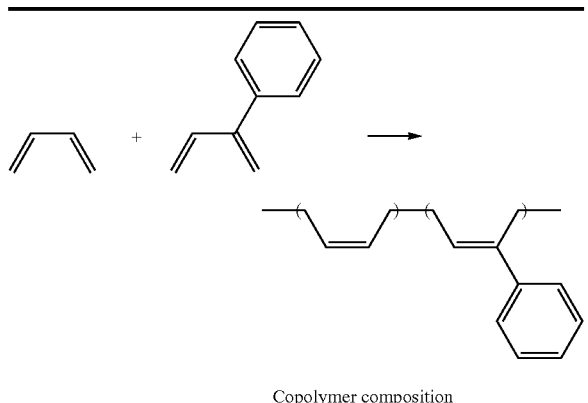

| Feed | | | Copolymer composition | | | | | |
|---|---|---|---|---|---|---|---|---|
| | | | | % 1,4- | | | % of BD | |
| % BD | % PhBD | % Yield | % PhBD | % 1,4-cis BD | trans BD | % 1,2 BD | that is cis | $T_g$ |
| 81 | 19 | 85 | 20.1 | 73.5 | 3.2 | 4.2 | 90.8 | −94° C. |
| 75 | 25 | 80 | 263 | 69.2 | 1.3 | 3.2 | 93.9 | −74° C. |
| 19 | 81 | 64 | 85 | 13.2 | 0.3 | 1.5 | 86.8 | −3° C. |
| 0 | 100 | 59 | 100 | — | — | — | — | 0-10° C. |

[1]Preparation of Z/N BD/PhBD copolymers. Polymer conditions: TiCl₄/AlHCl₂/AlI₃ catalyst, 15° C., 15 h. Table adapted from GB Patent 1002690.

The butadiene portions of the copolymers described in Table 6 were around 90% cis, which is comparable to the cis content of butadiene homopolymers prepared with the same catalysts. The physical properties of the copolymers were different from either butadiene homopolymers or styrene/butadiene copolymers, and most importantly, compounds containing the copolymers exhibited improved tear and tensile strength over either known polymer (GB1002690; Bruzzone,. *Kautschuk und Gummi—Kunststoffe* 1966, 19, 275.) The phenylbutadiene content of the copolymers was close to the phenylbutadiene content of the feed, suggesting that insertion of the two comonomers is approximately equally favorable, and the copolymers likely contain a random distribution of the two monomers. Related copolymers of even higher cis-contents could almost certainly be prepared using state-of-the-art Z/N catalysts such as lanthanide systems, however, to the best of our knowledge, copolymerization of butadiene and phenylbutadiene using lanthanide catalysts has not been reported.

Surprisingly, only a limited number of reports of phenylbutadiene/butadiene copolymers have appeared in the literature in the years since the appearance of these initial references. Phenylbutadiene copolymers have been mentioned in the claims of a few patents, but without extensive description of their preparation or the properties of the polymers (U.S. Pat. No. 3,937,692; U.S. Pat. No. 3,660,536; U.S. Pat. No. 5,135,816.) A study of the homopolymerization of 1-phenylbutadiene with both anionic and coordination catalysts was published in 1978, which reported that anionic poly-1-phenylbutadiene contains mainly trans-1,4 insertions, while the homopolymers prepared using cobalt of vanadium catalyst contains a high percentage of 3,4-inserted monomer units (Suzuki et al., *Macromolecules*, 1978, 11, 639.) A similar study was published by the same authors concerning homopolymers of 2-phenylbutadiene, which were found to exhibit between 67-100% cis-1,4 linkages.

A more thorough study of the Ziegler/Natta polymerization of 1- and 2-phenylbutadienes was published in 2002, however this report did not include any data concerning their copolymerization with other dienes such as butadiene (Pragliola et al., *Macromol. Rapid Commun.* 2002, 23, 356.) In this report, it was found that while homopolymers of 2-phenylbutadiene prepared with CpTiCl$_3$ were largely cis-1,4, homopolymers of trans-1-phenylbutadiene prepared with the same catalyst were mainly composed of 3,4-linkages. The authors also reported that cis-1-phenylbutadiene could not be polymerized under the same conditions. The results of these studies are summarized in Table 7.

The lack of reactivity of Z-1-phenylbutadiene and the 3,4-insertion of E-1-phenylbutadiene were both ascribed to the steric influence of the phenyl substituent of the monomer (Pragliola et al., *Macromol. Rapid Commun.* 2002, 23, 356.) Clearly, there is great value in investigation of copolymerization of 1-phenylbutadiene and 2-phenylbutadiene with BD using lanthanide catalysts, in the hopes of preparing new tire polymers with unique properties.

TABLE 7[1]

2-phenylbutadiene → CpTiCl$_3$/MAO → cis-1,4 polymer

E-1-phenylbutadiene → CpTiCl$_3$/MAO → 3,4 polymer

Z-1-phenylbutadiene → CpTiCl$_3$/MAO → no polymerization observed

[1]Homopolymerization of phenylbutadienes with CpTiCl$_3$/MAO catalyst. Adapted from Pragliola et al, Macromol. Rapid Commun. 2002, 23, 356.

What is claimed is:

1. A method of making a polymer, the method comprising the step of polymerizing 1,3-butadiene and a substituted butadiene of formula I or II

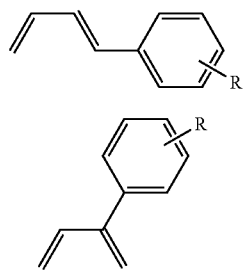

wherein R is hydrogen, an alkyl group, aryl group, or a fused cyclic group; in the presence of an organic solvent and a catalyst system comprising the reaction product of an organoaluminum compound, a neodymium carboxylate, and a dialkyl aluminum chloride.

2. The method of claim 1, wherein R is hydrogen and the substituted butadiene in 1-phenylbutadiene.

3. The method of claim 1, wherein R is hydrogen and the substituted butadiene is 2-phenylbutadiene.

4. The method of claim 1, wherein at least 98 percent by weight of the repeat units have a cis-1,4 microstructure.

5. The method of claim 1, wherein the organoaluminum compound contains at least one carbon to aluminum bond and is represented by the structural formula:

$$R^1-Al\begin{matrix}R^2\\R^3\end{matrix}$$

in which $R^1$ is selected from the group consisting of alkyl, cycloalkyl, alkoxy, aryl, alkaryl, arylalkyl radicals and hydrogen: $R^2$ is selected from the group consisting of alkyl, cycloalkyl, aryl, alkaryl, arylalkyl radicals and hydrogen and $R^3$ is selected from a group consisting of alkyl, cycloalkyl, aryl, alkaryl and arylalkyl radicals.

6. The method of claim 1, wherein the organoaluminum compound is selected from the group consisting of diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, benzylisopropylaluminum hydride, ethylaluminum dihydride, butylaluminum dihydride, isobutylaluminum dihydride, octylaluminum dihydride, amylaluminum dihydride, diethylaluminum ethoxide, dipropylaluminum ethoxide, trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, and diethylbenzylaluminum.

7. The method of claim 1, wherein the neodymium carboxylate comprises an organic monocarboxylic acid derivative ligand that contains from 1 to 20 carbon atoms.

8. The method of claim 1, wherein the atomic ratio of the chloride ion to the neodymium metal ranges from about 0.1/1 to about 6/1.

* * * * *